United States Patent
Lee et al.

(10) Patent No.: US 11,598,607 B2
(45) Date of Patent: Mar. 7, 2023

(54) REFLEX SIGHT WITH ULTRAVIOLET-SENSITIVE LENS AND SHROUD

(71) Applicant: Strike IP, LLC, Las Vegas, NV (US)

(72) Inventors: Shanyao Lee, Las Vegas, NV (US); Felix Danishwara, Las Vegas, NV (US)

(73) Assignee: Strike IP, LLC, Las Vegas, NV (US)

( * ) Notice: Subject to any disclaimer, the term of this patent is extended or adjusted under 35 U.S.C. 154(b) by 0 days.

(21) Appl. No.: 17/676,360

(22) Filed: Feb. 21, 2022

(65) Prior Publication Data

US 2022/0282953 A1 Sep. 8, 2022

Related U.S. Application Data

(60) Provisional application No. 63/157,615, filed on Mar. 5, 2021.

(51) Int. Cl.
*F41G 1/30* (2006.01)
*G02B 23/16* (2006.01)
*G02B 5/23* (2006.01)

(52) U.S. Cl.
CPC ............... *F41G 1/30* (2013.01); *G02B 5/23* (2013.01); *G02B 23/16* (2013.01)

(58) Field of Classification Search
CPC .............. F41G 1/30; G02B 5/23; G02B 23/16
See application file for complete search history.

(56) References Cited

U.S. PATENT DOCUMENTS

| | | | | |
|---|---|---|---|---|
| 5,851,328 A * | 12/1998 | Kohan | ............... | B29D 11/0073 156/273.7 |
| 9,823,044 B1 * | 11/2017 | Cabrera | ................ | F41G 11/003 |
| 2007/0227018 A1 * | 10/2007 | Ellig | ....................... | F41G 1/467 33/265 |
| 2012/0137529 A1 * | 6/2012 | Minica | .................... | F41G 1/467 33/265 |
| 2014/0036227 A1 * | 2/2014 | Tamura | .................. | G02C 7/102 252/585 |
| 2015/0268000 A1 * | 9/2015 | Carroll | ...................... | F41G 1/38 42/111 |
| 2019/0360777 A1 * | 11/2019 | Grace | ...................... | F41G 1/345 |
| 2020/0271419 A1 * | 8/2020 | Grace | ....................... | F41G 1/30 |
| 2020/0278177 A1 * | 9/2020 | Grace | ....................... | F41G 1/30 |
| 2021/0003867 A1 * | 1/2021 | Takenaka | ......... | B29D 11/00653 |

* cited by examiner

*Primary Examiner* — Joshua E Freeman
(74) *Attorney, Agent, or Firm* — Han IP PLLC; Andy M. Han

(57) ABSTRACT

An apparatus implementable on a firearm includes a lens, a light source, a control unit coupled to control the light source to project an image of an aim point onto the lens, and a housing structure that houses the lens, the light source, and the control unit, with a portion of the housing structure forming a shroud that surrounds the lens. The lens includes an ultraviolet (UV)-sensitive lens that darkens responsive to sensing a UV light. Alternatively, or additionally, the shroud is sensitive to the UV light and a color of the shroud darkens responsive to sensing the UV light.

20 Claims, 5 Drawing Sheets

500A — Original lens/ shroud in the bright environment

500B — UV/ light color-changing lens/ shroud in the bright environment

REFLEX SIGHT WITH ULTRAVIOLET-SENSITIVE LENS AND SHROUD

CROSS-REFERENCE TO RELATED PATENT APPLICATION(S)

The present disclosure is part of a non-provisional application claiming the priority benefit of U.S. patent application Ser. No. 63/157,615, filed 5 Mar. 2021, the content of which being incorporated by reference in its entirety.

TECHNICAL FIELD

The present disclosure is generally related to firearm accessories and, more particularly, to a reflex sight with ultraviolet (UV)-sensitive lens and shroud.

BACKGROUND

Unless otherwise indicated herein, approaches described in this section are not prior art to the claims listed below and are not admitted as prior art by inclusion in this section.

Reflex sights, or reflector sights, are widely used in the defense industries, shooting sports, as well as personal defense to assist target aiming. In principle, a reflex sight is an optical sight that allows the user to look through a partially reflecting lens and see an illuminated projection of an aim point (e.g., a dot or some geometric shape) superimposed on the field of view. In some reflex sights, a light-emitting diode (LED) projects a light (e.g., image of a dot) to a lens which reflects the light toward eye(s) of a user for aiming a target. However, when using such a reflex sight under a broad daylight, it tends to be difficult for the user to see the LED image on the lens due to lack of contrast for the brightness from the sunlight. Therefore, there is a need for a solution to address this issue.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In view of the aforementioned issues, an objective of the present disclosure is to propose innovative designs of a reflex sight with a UV-sensitive lens and shroud. It is believed that the proposed designs can avoid or otherwise minimize aforementioned issue associated with conventional reflex sights.

In one aspect, an apparatus implementable on a firearm may include a reflex sight which may include an ultraviolet (UV)-sensitive lens, a light source, and a control unit coupled to control the light source to project an image of an aim point onto the lens. Moreover, the lens may darken responsive to sensing a UV light.

In another aspect, an apparatus implementable on a firearm may include a reflex sight which may include a lens, a light source, a control unit coupled to the light source to project an image of an aim point onto the lens, and a housing structure that houses the lens, the light source, and the control unit. A portion of the housing structure may form a shroud that surrounds the lens. Moreover, the shroud may be sensitive to a UV light and a color of the shroud may darken responsive to sensing the UV light.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED IMPLEMENTATIONS

Figure 1:
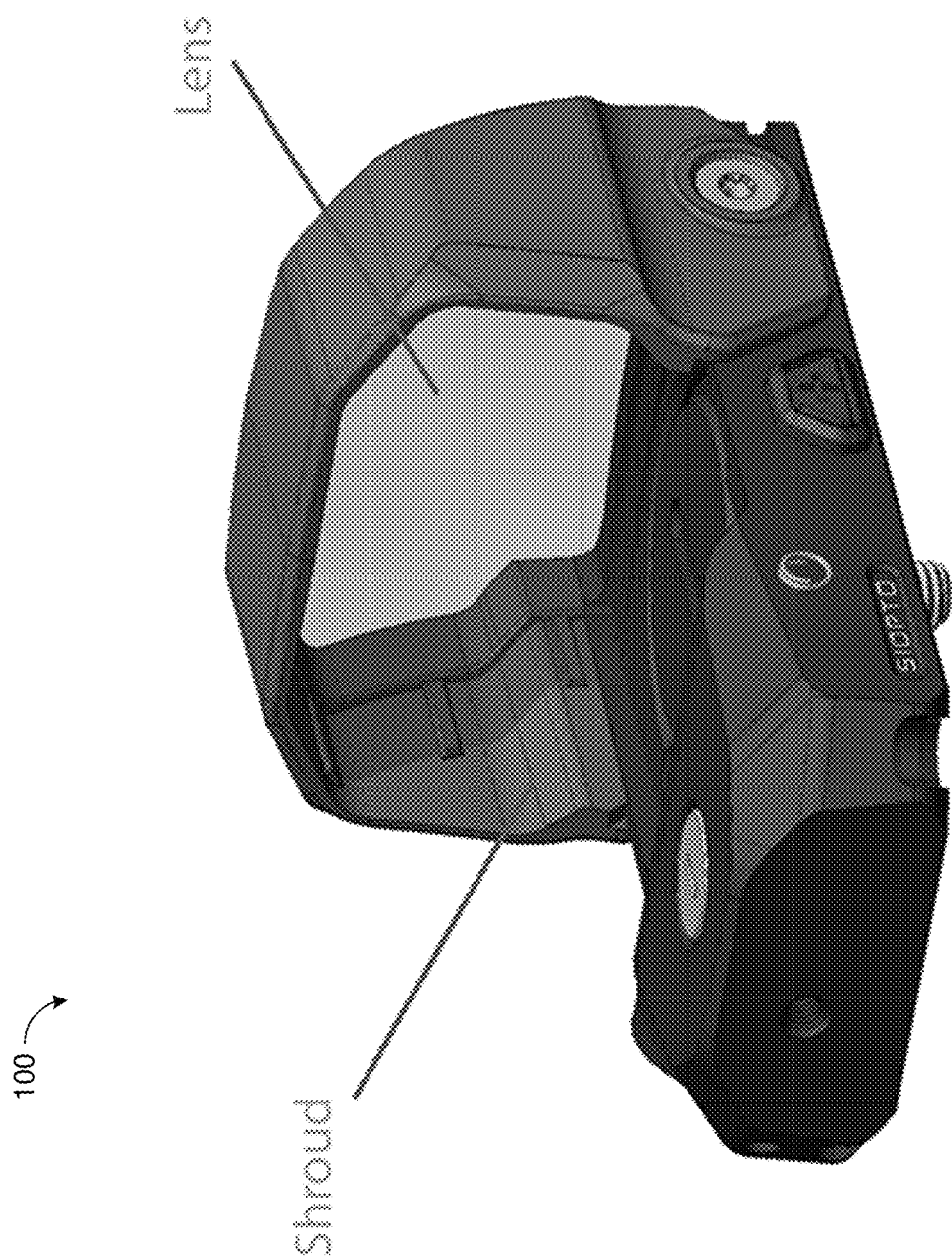
FIG. 1 is a diagram of an apparatus in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

The position terms used in the present disclosure, such as "front", "forward", "rear", "back", "top", "bottom", "left", "right", "head", "tail" or the like assume a firearm in the normal firing position, with the firearm being in a position in which the longitudinal axis of the barrel of the firearm runs generally horizontally and the direction of firing points "forward" away from the operator or user of the firearm. The same convention applies for the direction statements used herein.

As used herein, the terms "proximal" and "proximally" may denote "forward" and "forwardly" with respect to the firearm, and the terms "distal" and "distally" may denote "rearward" and "rearwardly" with respect to the firearm. As used herein, the verb "to comprise" in this description, claims, and other conjugations are used in its non-limiting sense to mean those items following the word are included, but items not specifically mentioned are not excluded. As used herein, the word "forward" means moving in the direction that the projectile moves during firing a firearm. As used herein, the word "proximal" means closer to the reference point, in this case, the shooter. As used herein, the word "distal" means farther to the reference point, in this case, the shooter. Reference to an element by the indefinite article "a" or "an" does not exclude the possibility that more than one of the elements are present, unless the context clearly requires that there is one and only one of the elements. The indefinite article "a" or "an" thus usually means "at least one." Additionally, the words "a" and "an" when used in the present document in concert with the words "comprising" or "containing" denote "one or more."

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure. The recitation of numerical ranges by endpoints includes all numbers within that range (e.g., 1 to 5 includes 1, 1.5, 2, 2.75, 3, 3.80, 4, and 5). All dimensions given herein are by way of examples to better illustrate the present disclosure embodiments and shall not be construed to limit the dimensions of the present disclosure embodiments to the given numeric values.

Overview

Figure 2:
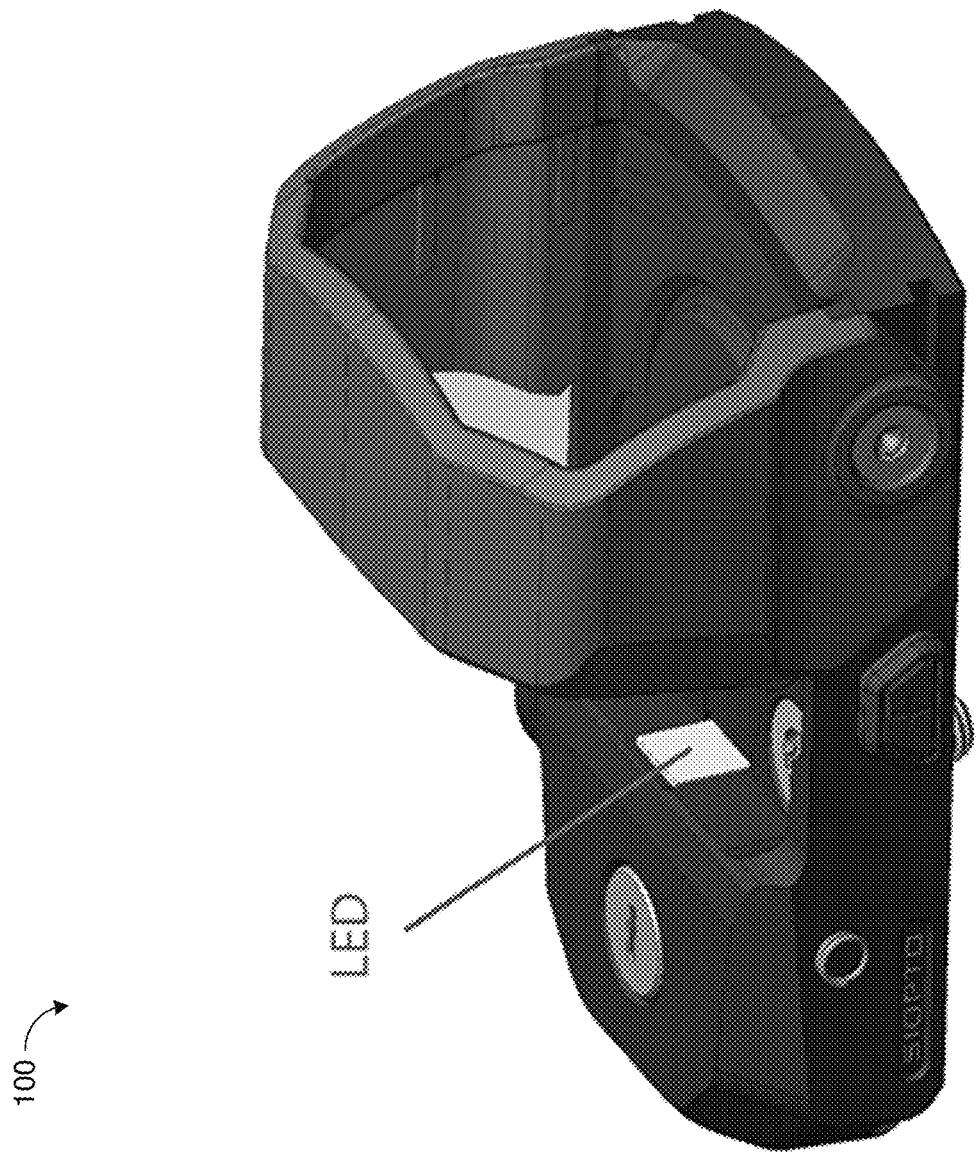
FIG. 2 is another diagram of the apparatus in accordance with an implementation of the present disclosure.
Figure 3:
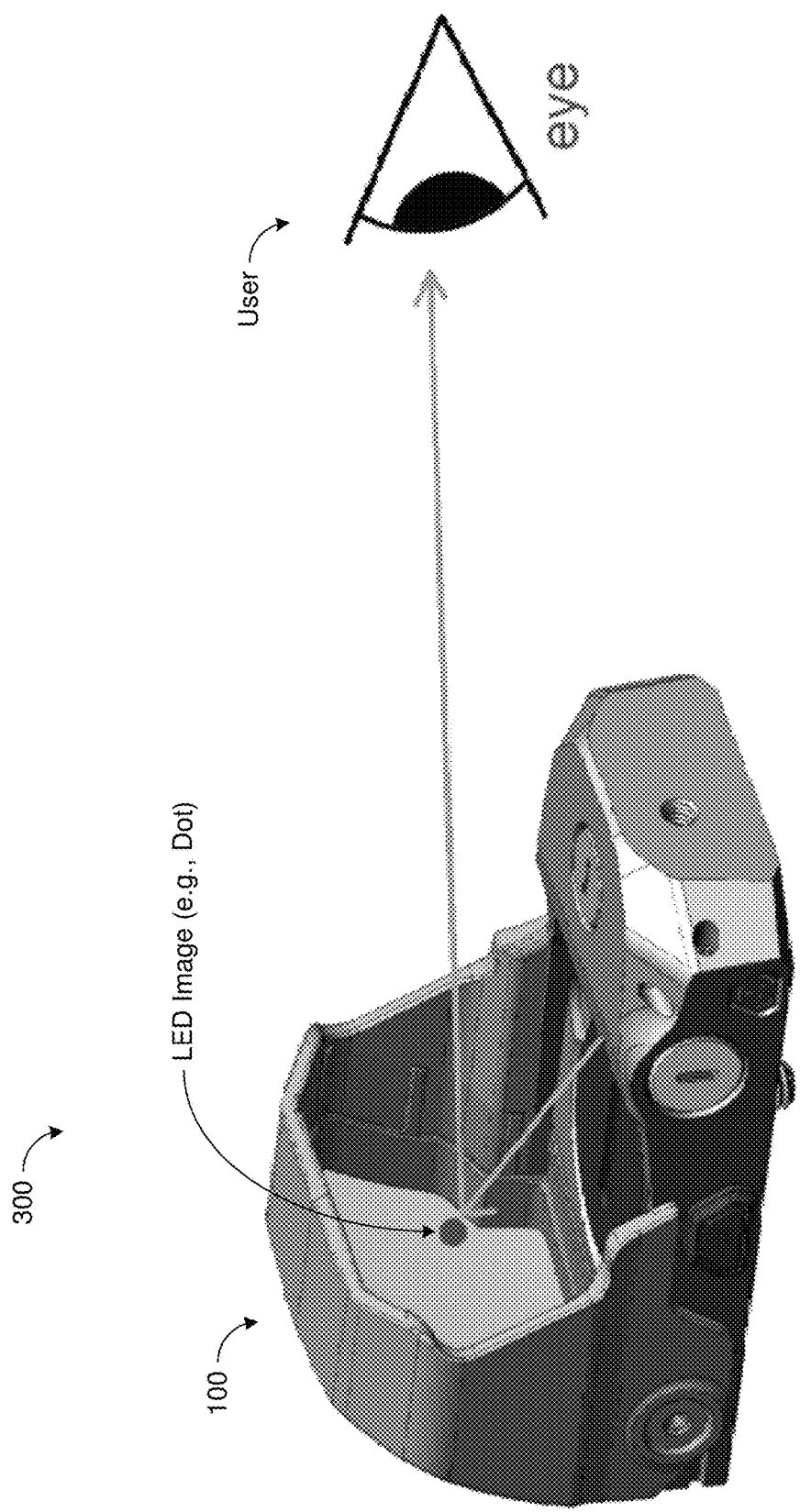
FIG. 3 is a diagram of an example scenario of the apparatus in operation in accordance with an implementation of the present disclosure.

FIG. 1 and FIG. 2 each illustrates an apparatus 100 in accordance with an implementation of the present disclosure. Apparatus 100 may include a reflex sight as a cost-effective solution to address aforementioned issue with conventional reflex sights. Referring to FIG. 1 and FIG. 2, visible components of apparatus 100 may include a lens, a light source (e.g., an LED) and a shroud as part of a housing structure of apparatus 100. FIG. 3 illustrates an example scenario 300 of apparatus 100 in operation in accordance with an implementation of the present disclosure. In scenario 300, a user (represented by an eye of user in FIG. 3) can view aim point projected by apparatus 100. The aim point may be, for example and without limitation, may be a dot of an LED image provided by the light source.

Figure 4:
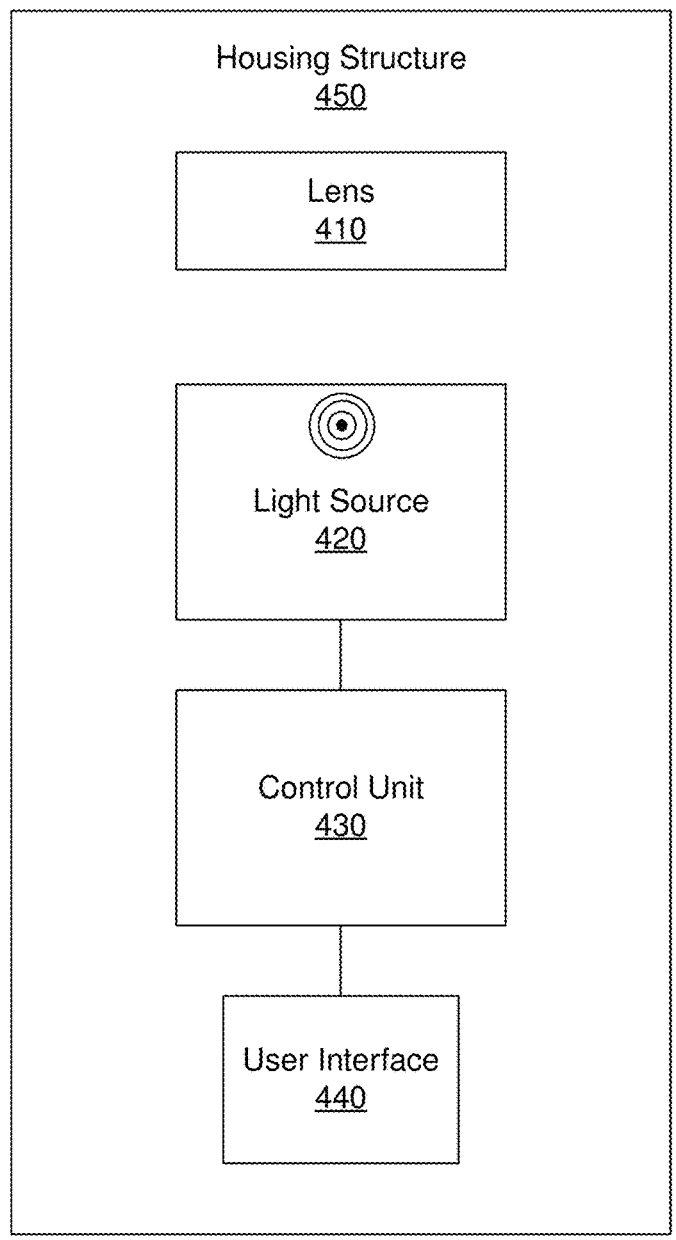
FIG. 4 is a schematic diagram of an apparatus in accordance with an implementation of the present disclosure.

FIG. 4 is a schematic diagram of an apparatus 400 in accordance with an implementation of the present disclosure. Apparatus 400 may be an example implementation of apparatus 100. Referring to FIG. 4, apparatus 400 may include a lens 410, a light source 420, and a control unit 430 coupled to control light source 420. Apparatus 400 may also include a housing structure 450 such that each of lens 410, light source 420 and control unit 430 may be disposed on or contained in housing structure 450. Moreover, a portion of housing structure 450 may form a shroud that surrounds lens 410, thereby at least partially blocks light coming from certain angles (e.g., from the top, left side and right side) with respect to lens 410. The shroud (or the entire housing structure 450) may be made of metal, polymer/plastic, rubber, silicone, or any combination thereof. Light source 420 may include at least one LED and may be configured to project an image of an aim point (e.g., a dot) onto lens 410. In operation, control unit 430 may be configured to control light source 420 (e.g., turning on, turning off, increasing brightness of the aim point, and decreasing brightness of the aim point) in projecting the aim point onto lens 410.

Under one proposed design, lens 410 may change color (e.g., darken) in response to sensing a UV light. Additionally, a degree of color change (e.g., darkness) of lens 410 may be proportional to an intensity of the UV light. Under the proposed design, lens 410 may be coated with a layer of a UV-sensitive material (e.g., photochromic pigments and/or other suitable UV-sensitive color-changing elements). Alternatively, or additionally, lens 410 may be impregnated or otherwise embedded with a UV-sensitive material (e.g., photochromic pigments and/or other suitable UV-sensitive color-changing elements).

Under one proposed design, the shroud of housing structure 450 may be sensitive to the UV light and a color of the shroud may change (e.g., darken) responsive to sensing the UV light. Under the proposed design, the color of the shroud may be transparent when not exposed to the UV light. Alternatively, the color of the shroud may be non-transparent when not exposed to the UV light. Additionally, a degree of change (e.g., darkness) of the color of the shroud may be proportional to an intensity of the UV light. Under the proposed design, the shroud may be coated with a layer of a UV-sensitive material (e.g., photochromic pigments and/or other suitable UV-sensitive color-changing elements). For instance, the UV-sensitive material may include photochromic pigments.

Figure 5:
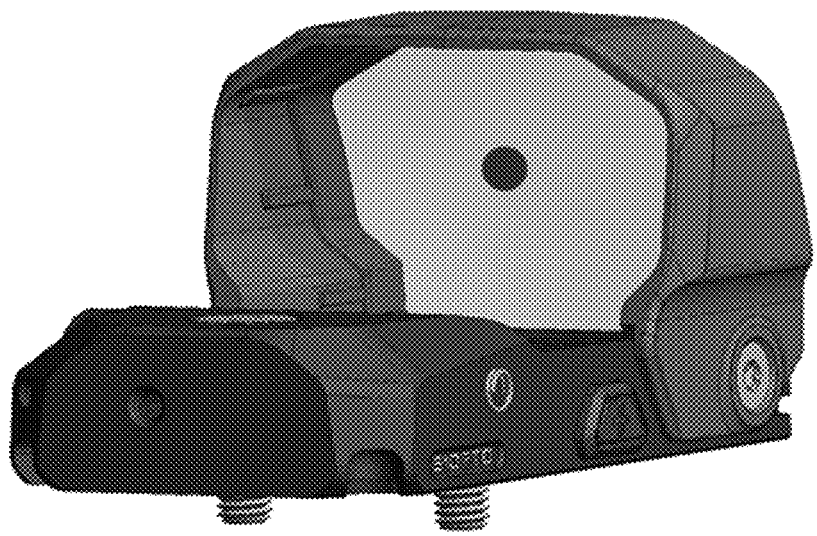
FIG. 5 is a diagram of example scenarios comparing a convention reflex sight to the apparatus in operation in accordance with an implementation of the present disclosure.
Figure 5:
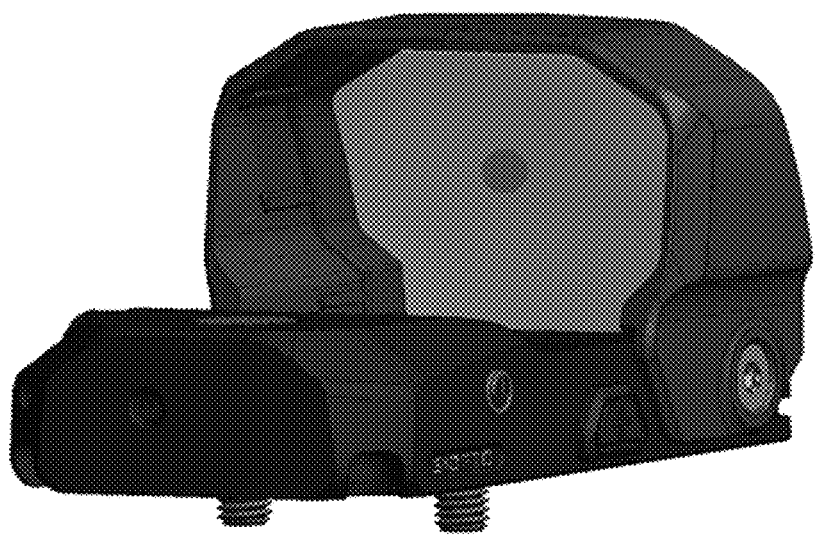

FIG. 5 illustrates example scenarios 500A and 500B comparing a convention reflex sight to apparatus 100 in operation in accordance with an implementation of the present disclosure. Specifically, scenario 500A shows a conventional reflex sight being disposed in a bright environment (e.g., under the sun), and scenario 500B shows apparatus 100 being disposed in a bright environment (e.g., under the sun). As shown in scenario 500B, either or both of lens 410 and the shroud of housing structure 450 may be UV-sensitive and, thus, may change color (e.g., to a darker color) when exposed to the UV light from the sun. As a result, the aim point resulting from the light projected onto lens 410 by light source 420 may be made to visually stand out more to become more visible, even without increasing the brightness of the light projected by light source 420.

Thus, under various proposed designs, either or both of lens 410 and the shroud of housing structure 450 may be sensitive to a UV light and, hence, may change color (e.g., darken) when exposed to the UV light. Advantageously, as lens 410 changes its color (e.g., turning dark from being transparent to being opaque or semi-opaque in grey or brown or another color), the LED image projected on lens 410 would visually stand out more and become more visible because of a stronger contrast given the color change (e.g., darkness) of its background formed by lens 410. Similarly, as the shroud of housing structure 450 changes its color (e.g., turning dark from being transparent or a non-transparent color to being opaque or semi-opaque in grey or brown or burgundy or another color) to provide shading over lens 410, the LED image projected on lens 410 would visually stand out more and become more visible because of a stronger contrast given the color change (e.g., darkness) of its background due to the shade/shading provided by the shroud in a darker color.

In view of the above, it is believed that apparatus 100 would provide a cost-effective solution to address aforementioned issue associated with conventional reflex sights when used in a bright environment. That is, with conventional reflex sights, a user would need to increase the brightness of the aim point projected onto the lens, but this would be at the expense of increased power consumption which would lead to shorter battery life. In contrast, with apparatus 100, when either or both lens 410 and the shroud of housing structure 450 change(s) color (e.g., darken(s)) when exposed to UV light (e.g., from the Sun), the aim point becomes more visible due to a stronger contrast with a darker background without the need to ever increase the brightness of the aim point itself, thereby avoiding the need of increased power consumption.

Example Implementations

In view of the above, the proposed designs of a reflex sight may be implemented in many ways. For illustrative purposes and without limiting the scope of the present disclosure, a few example implementations of the proposed design are described below.

In one aspect, an apparatus implementable on a firearm may include a UV-sensitive lens, a light source, and a control unit coupled to control the light source to project an image of an aim point onto the lens. Moreover, the lens may darken in response to sensing a UV light.

In some implementations, a degree of darkness of the lens may be proportional to an intensity of the UV light.

In some implementations, the lens may be coated with a layer of a UV-sensitive material. For instance, the UV-sensitive material may include photochromic pigments.

Alternatively, or additionally, the lens may be impregnated with a UV-sensitive material. For instance, the UV-sensitive material may include photochromic pigments.

In some implementations, the apparatus may further include a housing structure that houses the lens, the light source, and the control unit, with a portion of the housing structure forming a shroud that surrounds the lens.

In some implementations, the shroud may be sensitive to the UV light and a color of the shroud may darken responsive to sensing the UV light.

In some implementations, a degree of darkness of the color of the shroud may be proportional to an intensity of the UV light.

In some implementations, the shroud may be coated with a layer of a UV-sensitive material. For instance, the UV-sensitive material may include photochromic pigments.

In some implementations, the color of the shroud may be transparent when not exposed to the UV light.

In another aspect, an apparatus implementable on a firearm may include a lens, a light source, a control unit coupled to control the light source to project an image of an aim point onto the lens, and a housing structure that houses the lens, the light source, and the control unit, with a portion of the housing structure forming a shroud that surrounds the lens. Moreover, the shroud may be sensitive to a UV light and a color of the shroud may darken in response to sensing the UV light.

In some implementations, a degree of darkness of the color of the shroud may be proportional to an intensity of the UV light.

In some implementations, the shroud may be coated with a layer of a UV-sensitive material. For instance, the UV-sensitive material may include photochromic pigments.

In some implementations, the color of the shroud may be transparent when not exposed to the UV light.

In some implementations, the lens may include an UV-sensitive lens that darkens in response to sensing the UV light. In such cases, a degree of darkness of the lens may be proportional to an intensity of the UV light.

In some implementations, the lens may be coated with a layer of a UV-sensitive material. For instance, the UV-sensitive material may include photochromic pigments.

In some implementations, the lens may be impregnated with a UV-sensitive material. For instance, the UV-sensitive material may include photochromic pigments.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. An apparatus implementable on a firearm, comprising:
an ultraviolet (UV)-sensitive lens; a light source;
a control unit coupled to control the light source to project an image of an aim point onto the lens;
a housing structure that houses the lens, the light source, and the control unit, wherein the lens darkens responsive to sensing a UV light, wherein a portion of the housing structure forms a shroud portion that surrounds the lens, and
wherein only the shroud portion is sensitive to the UV light and a color of the shroud portion changes responsive to sensing the UV light.

2. The apparatus of claim 1, wherein a degree of darkness of the lens is proportional to an intensity of the UV light.

3. The apparatus of claim 1, wherein the lens is coated with a layer of a UV-sensitive material.

4. The apparatus of claim 3, wherein the UV-sensitive material comprises photochromic pigments.

5. The apparatus of claim 1, wherein the lens is impregnated with a UV-sensitive material.

6. The apparatus of claim 5, wherein the UV-sensitive material comprises photochromic pigments.

7. The apparatus of claim 1, wherein the color of the shroud darkens responsive to sensing the UV light.

8. The apparatus of claim 7, wherein a degree of darkness of the color of the shroud is proportional to an intensity of the UV light.

9. The apparatus of claim 7, wherein the shroud is coated with a layer of a UV-sensitive material.

10. The apparatus of claim 9, wherein the UV-sensitive material comprises photochromic pigments.

11. The apparatus of claim 1, wherein a color of the shroud is transparent when not exposed to the UV light.

12. An apparatus implementable on a firearm, comprising:
a lens;
a light source;
a control unit coupled to control the light source to project an image of an aim point onto the lens; and
a housing structure that houses the lens, the light source, and the control unit, wherein a portion of the housing structure forms a shroud portion that surrounds the lens, and wherein only the shroud portion is sensitive to an ultraviolet (UV) light and a color of the shroud portion changes darkens responsive to sensing the UV light.

13. The apparatus of claim 12, wherein the color of the shroud darkens responsive to sensing the UV light, and wherein a degree of darkness of the color of the shroud is proportional to an intensity of the UV light.

14. The apparatus of claim 12, wherein the shroud is coated with a layer of a UV-sensitive material.

15. The apparatus of claim 14, wherein the UV-sensitive material comprises photochromic pigments.

16. The apparatus of claim 12, wherein a color of the shroud is transparent when not exposed to the UV light.

17. The apparatus of claim 12, wherein the lens comprises an UV-sensitive lens that darkens responsive to sensing the UV light, and wherein a degree of darkness of the lens is proportional to an intensity of the UV light.

18. The apparatus of claim 17, wherein the lens is coated with a layer of a UV-sensitive material or impregnated with the UV-sensitive material.

19. The apparatus of claim 18, wherein the UV-sensitive material comprises photochromic pigments.

20. The apparatus of claim 12, wherein, responsive to sensing the UV light, the color of the shroud changes from being transparent or being in a non-transparent color to being opaque or semi-opaque in a grey, brown or burgundy color.

* * * * *